United States Patent [19]

Kamada et al.

[11] 4,292,419
[45] Sep. 29, 1981

[54] PROCESS FOR PRODUCING RADIATION-SHIELDING PLASTIC MATERIALS

[75] Inventors: Kazumasa Kamada; Kazuya Okada, both of Otake, Japan

[73] Assignee: Mitsubishi Rayon Co., Ltd., Tokyo, Japan

[21] Appl. No.: 143,516

[22] Filed: Apr. 24, 1980

[30] Foreign Application Priority Data

May 15, 1979 [JP] Japan .................. 54/59357
May 16, 1979 [JP] Japan .................. 54/59957

[51] Int. Cl.³ .................. C08F 2/44; G21F 1/00; C07F 7/24
[52] U.S. Cl. .................. 526/192; 250/517; 252/478; 525/539; 526/240
[58] Field of Search .................. 526/192, 240; 525/539; 252/478; 250/517

[56] References Cited

U.S. PATENT DOCUMENTS 4,022,960  5/1977  Mima et al. .................. 526/240
4,129,524 12/1978  Nagai et al. .................. 526/192
4,182,821  1/1980  Nagai et al. .................. 526/192

*Primary Examiner*—John Kight, III
*Attorney, Agent, or Firm*—Oblon, Fisher, Spivak, McClelland & Maier

[57] ABSTRACT

A radiation-shielding plastic material having an excellent transparency and superior mechanical properties, is produced by polymerizing, in the presence of a lead compound, a mixture of a vinyl monomer component (A) consisting of at least one member selected from alkyl methacrylates and acrylates, hydroxyalkyl methacrylates and acrylates and styrene and an organic acid component (B) containing, as an indispensable ingredient, at least one member selected from the compounds of the formulae (I) through (IV):

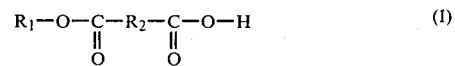

(I)

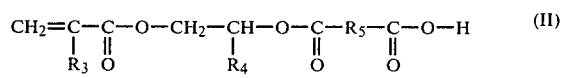

(II)

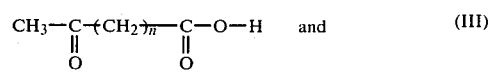

and (III)

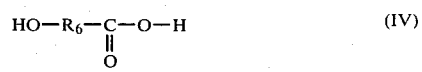

(IV)

wherein $R_1 = C_{1-10}$ hydrocarbon radical, $R_2 = C_{1-7}$ hydrocarbon radical, $R_3$ and $R_4 =$ H or $CH_3$, $R_5 = C_{2-7}$ hydrocarbon radical, $R_6 = C_{1-3}$ hydrocarbon radical and $n = 0 \sim 4$.

14 Claims, No Drawings

PROCESS FOR PRODUCING RADIATION-SHIELDING PLASTIC MATERIALS

FIELD OF THE INVENTION

The present invention relates to a process for producing radiation-shielding plastic material. More particularly, the present invention relates to a process for producing radiation-shielding plastic material having excellent transparency and mechanical properties.

BACKGROUND OF THE INVENTION

It is known that a lead sheet, a steel sheet, a laminate consisting of one or two wood sheet and a lead sheet, and a heavy concrete plate are useful for shielding a large dose of radiation. However, the above-mentioned conventional radiation-shielding materials are inconvenient to shield a small dose of radiation because they are too heavy and difficult to be processed. Also, as the above-mentioned conventional radiation-shielding materials are opaque, they cannot be utilized in any operation in which the radiation-shielding material is required to be transparent. Instead, for such operations a lead glass is used. However, the lead glass is disadvantageous in that it exhibits an unsatisfactory mechanical strength and a poor workability, for example, in cutting.

In order to eliminate the above-mentioned disadvantages, several approaches have been proposed to utilize a plastic material containing lead as a radiation-shielding material. That is, the plastic material is utilized as a matrix material having a satisfactory workability. For example, Japanese Patent Application Publication (Kokoku) No. 35-2360(1960) and Japanese Patent Application Laying-open (Kokai) No. 53-9995(1978) disclose a method for producing a radiation-shielding plastic material, in which method lead methacrylate or lead acrylate, alone or together with a vinyl ester monomer, is polymerized. Japanese Patent Application Laying-open (Kokai) No. 53-9994(1978) discloses a radiation-shielding plastic material comprising a blend of a transparent thermoplastic material and a specific organic acid lead salt. Japanese Patent Application Laying-open (Kokai) No. 53-9996(1978)discloses a process in which lead methacrylate or acrylate and a lead salt of a specific organic acid are copolymerized together with a vinyl monomer to provide a radiation-shielding plastic material. Also, Japanese Patent Application Laying-open No. 53-63310(1978) discloses a process in which a vinyl monomer, methacrylic or acrylic acid and a specific organic acid are copolymerized in the presence of lead monoxide, to provide a radiation-shielding plastic material.

However, the above-mentioned prior arts are disadvantageous for the following reasons.

(1) For any particular thickness of the radiation-shielding plastic material, an increase in the radiation-shielding property of the plastic material causes the transparency of the plastic material to undesirably decrease.

(2) The above mentioned increase in the radiation-shielding property of the plastic material also causes the mechanical properties to undesirably decrease, so that the plastic material is easily broken or cracked when it is used. In Japanese Patent Application Laying-open (Kokai) No. 54-1797(1979), an approach is proposed for eliminating the disadvantage in the mechanical properties of the radiation-shielding plastic material. However, this approach is disadvantageous in that the materials to be used are very special and the polymerization process is very complicated.

It is known that methacrylic acid and acrylic acid are effective for holding lead in an effective form for shielding-radiation, in the resultant polymerization product. However, it is also known that when a large amount of lead is held only by the methacrylic acid and/or the acrylic acid, the resultant polymerization product exhibits a decreased degree of transparency and a poor mechanical strength.

Furthermore, it is known that carboxylic acids having a hydrocarbon radical which has 4 or less carbon atoms, exhibit a satisfactory activity for dispersing and dissolving the lead compound in the polymerization mixture. However, since this type of carboxylic acid has a low boiling point, the polymerization mixture containing this type of the carboxylic acid must be polymerized in a restricted temperature range. Also, the resultant polymerization product exhibits a poor thermal property.

Moreover, it is known that other carboxylic acids having a hydrocarbon radical which has 5 or more carbon atoms, exhibit a poor activity for dispersing and dissolving therein the lead compound. Therefore, it is difficult to obtain a polymerization product containing the lead compound in an amount sufficient for obtaining a desired level of radiation-shielding property, and having satisfactory transparency and mechanical properties, from a polymerization mixture containing at least one member of the above-mentioned types of carboxylic acids.

Under the above-mentioned circumstances, it has been strongly desired to provide a process for producing a plastic material which contains therein lead in an amount sufficient for obtaining a desired degree of radiation-shielding activity, and which has excellent transparency and mechanical properties.

DISCLOSURE OF THE INVENTION

An object of the present invention is to provide a process for producing a radiation-shielding plastic material having a satisfactory radiation-shielding activity and transparency.

Another object of the present invention is to provide a process for producing a radiation-shielding plastic material having excellent mechanical properties and workability.

The above-mentioned objects can be attained by the process of the present invention, comprising polymerizing, in the presence of a lead compound, a mixture of:

(A) 10 to 94% by weight of a vinyl monomer component consisting of at least one vinyl monomer selected from the group consisting of alkyl methacrylates, alkyl acrylates, hydroxyalkyl methacrylates and hydroxyalkyl acrylates, in each of which the alkyl radical has 1 to 4 carbon atoms, and styrene, and;

(B) 6 to 90% by weight of an organic acid component containing, as an indispensable ingredient, at least one carboxylic acid selected from the group consisting of:

(a) dibasic carboxylic acid monoesters of the formula (I):

$$R_1-O-\underset{\underset{O}{\|}}{C}-R_2-\underset{\underset{O}{\|}}{C}-O-H \qquad (I),$$

(b) unsaturated carboxylic acids of the formula (II):

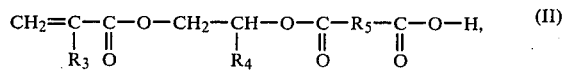

(c) oxocarboxylic acids of the formula (III):

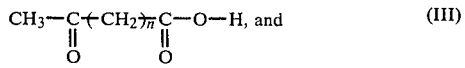

(d) hydroxycarboxylic acids of the formula (IV):

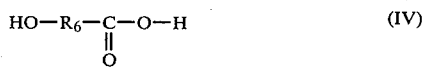

in which formulae (I) through (IV), $R_1$ represents a hydrocarbon radical having 1 to 10 carbon atoms; $R_2$ represents hydrocarbon radical having 1 to 7 carbon atoms; $R_3$ and $R_4$ respectively represent, independently from each other, a member selected from the group consisting of a hydrogen atom and a methyl radical; $R_5$ represents a hydrocarbon radical having 2 to 7 carbon atoms; $R_6$ represents a hydrocarbon radical having 1 to 3 carbon atoms, and; n represents an integer of from 0 to 4.

DETAILED DESCRIPTION OF THE INVENTION

In accordance with the process of the present invention, a radiation-shielding plastic material is produced by polymerizing a mixture of 10 to 94% by weight of a specified vinyl monomer component (A) and 6 to 90% by weight of a specified organic acid component (B), in the presence of a lead compound.

The vinyl monomer component consists of at least one vinyl monomer selected from the group consisting of alkyl methacrylates, alkyl, acrylate, hydroxyalkyl methacrylates and hydroxyalkyl acrylate, in each of which the alkyl radical has 1 to 4 carbon atoms, and styrene. Usually, the vinyl compound is selected from methyl methacrylate, ethyl acrylate, 2-hydroxyethyl methacrylate, 2-hydroxyethyl acrylate, 2-hydroxypropyl methacrylate and styrene. From the point of view of transparency, mechanical properties and thermal properties of the resultant polymerization product, it is preferable that the vinyl monomer component (A) consist of at least two monomers selected from methyl methacrylate, hydroxyalkyl methacrylates, hydroxyalkyl acrylates and styrene.

The vinyl monomer component (A) is used in an amount of from 10 to 94%, based on the total weight of the mixture of the vinyl monomer component (A) and the organic acid component (B). When the amount of the vinyl monomer component is less than 10% by weight, the resultant polymerization product exhibits deteriorated mechanical properties and a poor workability. An amount of the vinyl monomer component more than 94% by weight, causes decrease in the amount of the lead compound which can be contained in the resultant polymerization product. The decrease in the amount of the lead compound in the polymerization mixture results in a decrease in the radiation-shielding activity of the resultant polymerization product.

The organic acid component (B) is an essential component of the polymerization mixture, in that it is necessary for uniformly distributing and dissolving the lead compound in the polymerization mixture. The orgnic acid component (B) contains, as an indispensable ingredient, at least one carboxylic acid selected from those of the formulae (I) through (IV).

The dibasic carboxylic acid monoester of the formula (I) is a monoester of a dibasic carboxylic acid, which has a hydrocarbon radical having 1 to 7 carbon atoms, preferably, 2 to 3 carbon atoms, with an alcohol compound having 1 to 10 carbon atoms and may be selected from, for example, monoallylmaleate, monoallylsuccinate, monoallylglutarate, monoethylsuccinate, monobutylsuccinate, monomethylglutarate, monoethylglutarate, monoethylmaleate and monooctylmaleate.

The unsaturated carboxylic acid of the formula (II) is a monoester of a dibasic carboxylic acid, which has a hydrocarbon radical having 2 to 7 carbon atoms, with an alcohol compound of the formula:

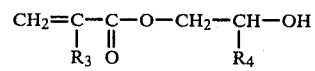

in which $R_3$ and $R_4$ are as defined hereinbefore. The above-mentioned alcohol compound may be selected from 2-hydroxyalkyl acrylates and 2-hydroxyalkyl methacrylates. That is, the unsaturated carboxylic acids of the formula (II) may include monomethacryloyloxyethyl succinate, monomethacryloyloxypropyl succinate, monoacryloyloxyethyl succinate, monomethacryloyloxyethyl maleate, monomethacryloyloxyethyl hexahydrophthalate and monomethacryloyloxyethyl trimellitate. Preferably, the unsaturated carboxylic acid of the formula (II) is a monoester of a dibasic caboxylic acid, which has a hydrocarbon radical having 2 to 3 carbon atoms, for example, succinic acid, maleic acid and glutaric acid with a member selected from 2-hydroxyethyl methacrylate, 2-hydroxypropyl methacrylate, 2-hydroxyethyl acrylate and 2-hydroxypropyl acrylate.

The oxocarboxylic acid of the formula (III) is preferably selected from the group consisting of pyruvic acid, levulinic acid, acetylbutyric acid and acetylvaleric acid, and most preferably, is levulinic acid.

Also, the hydroxycarboxylic acid of the formula (IV) is preferably selected from the group consisting of lactic acid and glycollic acid, and most preferably, is lactic acid.

The organic acid component (B) is used in an amount of 6 to 90%, based on the total weight of the mixture of the organic acid component (B) and the vinyl monomer component (A). The amount of the organic acid component (B) to be used is determined depending on the amount of the lead to be contained in the resultant polymerization product. However, an amount of the organic acid component (B) more than 90% results in a poor mechanical strength and workability of the resultant polymerization product. Also, an amount of the organic acid component less than 6% causes the capability of the resultant polymerization product to hold therein the lead to be poor, and results in a poor radiation-shielding property of the polymerization product.

It is not completely clear as to how the carboxylic acids of the formulae (I) through (IV) hold the head compound in the resultant polymerization product. However, it was found by the inventors of the present invention that, since the carboxylic acids of the formulae (I) through (IV) have a high boiling point, and exhibit a superior activity for dispersing and dissolving the lead compound in the polymerization mixture, it is possible to produce a plastic material containing an amount of the lead compound large enough to obtain a desired degree of the radiation-shielding activity, and exhibiting a satisfactory transparency and excellent mechanical properties.

It is preferable that the amount of the indispensable ingredient consisting of at least one carboxylic acid selected from those of the formulae (I) through (IV), is at least 5% based on the entire weight of the organic acid component (B). If the content of the indispensable ingredient is less than 5% based on the entire weight of the organic acid component (B), sometimes the resultant polymerization product exhibits an unsatisfactory transparency and deteriorated mechanical properties. Generally, the above-mentioned disadvantages are increased by increasing the content of the lead in the polymerization product. Therefore, when the lead is used in a large amount, the indispensable ingredient should be used in an increased amount.

The organic acid component (B) may consist of the indispensable ingredient alone. However, when the organic acid component only consists of a dibasic carboxylic acid monoester of the formula (I) in which the hydrocarbon radical represented by $R_1$ is saturated, the resultant polymerization product tends to exhibit slightly unsatisfactory mechanical properties. Therefore, it is preferable that the above-mentioned type of the dibasic carboxylic acid monoester of the formula (I), in which the hydrocarbon radical represented by $R_1$ is saturated, be used in an amount of 75% or less based on the entire weight of the organic acid component (B). In this case, it is also preferable that the remaining portion of the organic acid component (B) consist of at least one polymerizable carboxylic acid selected from, for example, methacrylic acid, acrylic acid, dibasic carboxylic acid monoesters of the formula (I) in which the hydrocarbon radical represented by $R_1$ is an allyl radical, and the other hydrocarbon radical represented by $R_2$ is unsaturated, and unsaturated carboxylic acid of the formula (II).

The organic acids which may be contained, as a dispensable ingredient, together with the indispensable ingredient, in the organic acid component (B), may be selected from polymerizable unsaturated carboxylic acids, for example, methacrylic acid and acrylic acid, and; fatty acids, for example, propionic acid, isobutyric acid, capric acid, caprylic acid, oleic acid and isovaleric acid. It is preferable that the dispensable organic acid be selected from a polymerizable unsaturated carboxylic acid, such as methacrylic acid and acrylic acid, and nonpolymerizable carboxylic acids having a hydrocarbon radical which has 4 to 10 carbon atoms, for example, isovaleric acid, capric acid and caprylic acid.

The degree of the radiation-shielding activity of the polymerization product is variable depending on the content of lead in the polymerization product. The maximum content of lead which can be contained in the polymerization product is variable depending on the content of the organic acid component (B) in the polymerization mixture. Usually, it is preferable that the molar content of the lead compound in terms of lead in the polymerization mixture be 50% or less based on the sum of molar amounts of all the organic acids contained in the organic acid component (B). When the lead compound is used in an amount of more than 50% in terms of lead, sometimes it requires a long time to complete the uniform dispersing and/or dissolving of the lead compound in the polymerization mixture, the resultant polymerization product exhibits an unsatisfactory transparency and/or, in a special case, the lead compound is converted into a product insoluble in the polymerization mixture, which insoluble product causes the resultant polymerization product to be opaque.

The content of lead to be contained in the polymerization product is variable depending on the desired degree of the radiation-shielding activity and the desired thickness of the plastic material. With any thickness of the plastic material, it is preferable that the content of lead in the resultant plastic material be in a range of from 5 to 54% by weights.

The lead compound to be contained in the polymerization mixture is preferably selected from the group consisting of lead monoxide, lead acetate, lead propionate, lead isobutyrate and lead lactate, and most preferably, is lead monoxide.

Before the polymerization procedure is started, the vinyl monomer component (A) is mixed with the organic acid component (B) and the lead compound, and the mixture is stirred, if necessary, at an elevated temperature, to provide a clear polymerization mixture. If it is necessary, the polymerization mixture can contain a polymerization inhibitor.

In order to allow the polymerization reaction to start, the polymerization mixture is mixed with a radical polymerization initiator comprising at least one member selected from, for example, azo-bis-isobutyronitrile, azo-bis-2,4-dimethylvaleronitrile, benzoyl peroxide, lauroyl peroxide. Then, the polymerization mixture is poured into a mold, for example, a cell which is formed between two plates made of aluminum, stainless steel or glass, and spaced from each other while being in parallel to each other. The cell is sealed with a gasket material. The polymerization mixture contained in the cell is heated at an elevated polymerization temperature, for example, from 30° to 120° C. After the polymerization reaction has been completed, the resultant solid plastic material is removed from the mold.

The polymerization mixture may contain any additives, for example, ultraviolet ray absorbent, dye, pigment and other polyfunctional monomer, unless the purpose of the present invention is hindered by the additives. Also, the polymerization mixture may be polymerized in the presence of a filler of, for example, glass fibers, uniformly distributed in the mixture or a metallic net embedded in the mixture, in order to produce a plastic material reinforced with the filler or the metallic net.

Furthermore, the polymerization mixture may be polymerized in a cell formed by a pair of acrylic resin sheets and sealed with a gasket material. In this case, the acrylic resin sheets are incorporated onto both surfaces of the resultant plastic material to form a composite laminate. The methacrylate resin plates are effective for protecting the radiation-shielding plastic material from weathering and mechanical impact.

Moreover, the outer surface of the plastic material may be coated with a transparent and hard coating layer consisting, preferably, of a cross-linked polymer. The coating layer is also effective for protecting the radiation-shielding plastic material from weathering and mechanical impact, and for preventing scraping and scratching of the radiation-shielding plastic material.

The features and advantages of the process of the present invention will be further illustrated by the examples set forth below. However, the examples are only illustrative and should in no way be interpreted as limiting the scope of the present invention.

EXAMPLES 1 THROUGH 7 AND COMPARISON

Examples 1 through 3

In each of the Examples 1 through 7 and Comparison Examples 1 through 3, a polymerization mixture was prepared by mixing a vinyl monomer component (A), an organic acid component (B) and a lead compound each as specified in Table 1 and each in an amount as indicated in Table 1. The resultant polymerization mixture was mixed with 0.1%, based on the weight of the polymerization mixture, of a radical polymerization initiator consisting of azo-bisisobutyronitrile (AIBN).

The polymerization mixture containing the initiator was poured into a cell which had been formed by two glass plates sealed with a polyvinyl chloride gasket material. The poured polymerization mixture was left standing at a temperature of 80° C. for 5 hours and, thereafter, at 120° C. for 2 hours, so as to allow the polymerization mixture to be polymerized and solidified. Thereafter, the solidified plastic plate was removed from the cell.

The resultant plastic plate was subjected to measurements of thickness, luminous transmittance of the entire visible light spectrum in accordance with ASTM D 1003-61 and flexural strength in accordance with ASTM D 79066. The results of the measurements are shown in Table 2.

TABLE 2

| Example No. | Thickness (mm) | Luminous transmittance (%) | Flexural strength (kg/mm$^2$) |
|---|---|---|---|
| Example 1 | 4 | 91 | 7.1 |
| 2 | 4 | 90 | 8.5 |
| 3 | 4 | 88 | 7.5 |
| 4 | 4 | 89 | 7.3 |
| 5 | 4 | 90 | 7.9 |
| 6 | 4 | 85 | 6.7 |
| 7 | 4 | 90 | 7.4 |
| Comparison Example 1 | 4 | 35 | 3.1 |
| 2 | 4 | 75 | 3.2 |
| 3 | 4 | 81 | 3.5 |

EXAMPLE 8

The same polymerization mixture as that described in Example 1 was mixed with 0.1%, based on the weight of the polymerization mixture, of a radical polymerization initiator consisting of azo-bisisobutyronitrile. The mixture was poured into a cell composed of a pair of composite plates, each composed of a glass plate and an acrylic resin sheet having a thickness of 1 mm and superimposed on the glass plate inside the cell, and sealed with a gasket material made of polyvinyl chloride.

The poured mixture was heated at a temperature of 80° C. for 5 hours and, then, at a temperature of 120° C. for 2 hours, so as to polymerize and solidify it. The acrylic resin sheets were bonded to both surfaces of the resultant plastic material, to provide a composite plastic material. The composite plastic material exhibited an

TABLE 1

| Example No. | Vinyl monomer component (A) | | | | | Organic acid component (B) | | | | | | | Lead Compound | |
| | | | | | | Indispensable ingredient | | | | Dispensable ingredient | | | | |
| | | | | | | A | | B | | | Other | | | |
| | MMA (g) | EA (g) | Styrene (g) | 2-HEMA (g) | 2-HEA (g) | Type | Amount (g) | Type | Amount (g) | MAA (g) | Type | Amount (g) | Type | Amount (g) |
| Example 1 | 17 | — | — | 16 | — | Levulinic acid | 37 | — | — | 30 | — | — | PbO | 66 |
| 2 | 5 | 5 | 10 | 19 | — | ES | 19 | MES | 10 | 25 | — | — | PbO | 40 |
| 3 | 30 | — | 5 | — | — | Levulinic acid | 31 | OM | 25 | — | — | — | PbO | 35 |
| 4 | 21 | — | 10 | 10 | 5 | MEM | 25 | OM | 20 | — | Caprylic acid | 25 | PbO | 30 |
| 5 | — | 10 | 5 | 15 | — | ES | 21 | Levulinic acid | 15 | 30 | — | — | PbO | 50 |
| 6 | 40 | — | — | 10 | — | ES | 15 | — | — | 20 | — | — | Lead acetate | 45 |
| 7 | 15 | — | 10 | 5 | — | Levulinic acid | 25 | Lactic acid | 5 | 30 | — | — | PbO | 50 |
| Comparison Example 1 | 30 | — | 10 | 5 | — | — | — | — | — | 30 | — | — | PbO | 25 |
| 2 | 17 | — | — | 16 | — | — | — | — | — | 30 | Isobutyric acid | 37 | PbO | 66 |
| 3 | 5 | 5 | 10 | 19 | — | — | — | — | — | 25 | Caprylic acid | 30 | PbO | 40 |

Note:
MMA:Methylmethacrylate,
EA:Ethylacrylate,
2-HEMA:2-hydroxyethyl methacrylate
2HEA:2-hydroxyethyl acrylate,
MEM:Monomethacryloyloxyethyl maleate,
MES:Monomethacryloyloxyethyl succinate,
ES:Monoethyl succinate,
OM:Monooctyl maleate
MAA:Methacrylic acid,
PbO:Lead monoxide enhanced weather-proofing property and mechanical properties. Also, it was found that the interface between the acrylic resin sheet and the polymerized plastic material exhibited no optical and dynamic strains.

The resultant composite radiation-shielding plastic material had a thickness of 6 mm, and exhibited a luminous transmittance of 90% over the entire visible light spectrum and a flexural strength of 9.4 kg/mm$^2$.

We claim:

1. A process for producing a radiation-shielding plastic material, which comprises polymerizing, in the presence of a radical polymerization initiator and a lead compound, a mixture of:

(A) 10 to 94% by weight of a vinyl monomer component consisting of at least one vinyl monomer selected from the group consisting of alkyl methacrylates, alkyl acrylates, hydroxyalkyl methacrylates and hydroxyalkyl acrylates, in each of which the alkyl radical has 1 to 4 carbon atoms, and styrene, and;

(B) 6 to 90% by weight of an organic acid component containing, as an indispensable ingredient, at least one carboxylic acid selected from the group consisting of:

(a) dibasic carboxylic acid monoesters of the formula (I):

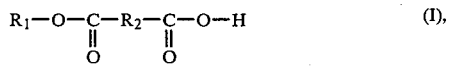

(b) unsaturated carboxylic acid of the formula (II):

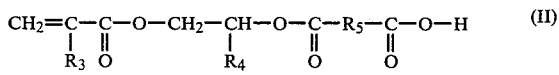

(c) oxocarboxylic acids of the formula (III):

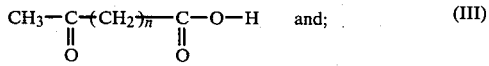

(d) hydroxycarboxylic acids of the formula (IV):

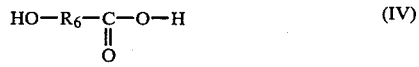

in which formulae (I) through (IV), $R_1$ represents a hydrocarbon radical having 1 to 10 carbon atoms; $R_2$ represents a hydrocarbon radical having 1 to 7 carbon atoms; $R_3$ and $R_4$ respectively represent, independently from each other, a member selected from the group consisting of a hydrogen atom and a methyl radical; $R_5$ represents a hydrocarbon radical having 2 to 7 carbon atoms; $R_6$ represents a hydrocarbon radical having 1 to 3 carbon atoms, and; n represents an integer of from 0 to 4.

2. A process as claimed in claim 1, wherein the molar amount of said lead compound in terms of lead, corresponds to 50% or less of the sum of the molar amounts of said organic acids contained in said organic acid component (B).

3. A process as claimed in claim 1, wherein the sum of the amounts of said organic acids contained in said organic acid component (B) is not less than 5% of the entire weight of said organic acid component (B).

4. A process as claimed in claim 1, wherein said dibasic carboxylic acid ester of the formula (I) is a monoester of a dibasic carboxylic acid, which has a hydrocarbon radical having 2 to 3 carbon atoms, with an alcohol having 1 to 10 carbon atoms.

5. A process as claimed in claim 1, wherein said unsaturated carboxylic acid of the formula (II) is a monoester of a dibasic carboxylic acid, which has a hydrocarbon radical having 2 to 3 carbon atoms, with a member selected from the group consisting of 2-hydroxyethyl methacrylate, 2-hydroxypropyl methacrylate, 2-hydroxyethyl acrylate and 2-hydroxypropyl acrylate.

6. A process as claimed in claim 1, wherein said oxocarboxylic acid of the formula (III) is selected from the group consisting of pyruvic acid, levulinic acid, acetylbutyric acid and acetylvaleric acid.

7. A process as claimed in claim 1, wherein said hydroxycarboxylic acid of the formula (IV) is selected from the group consisting of lactic acid and glycollic acid.

8. A process as claimed in claim 1, wherein said organic acid component (B) contains, as a dispensable ingredient, at least one member selected from the group consisting of polymerizable unsaturated carboxylic acids and nonpolymerizable carboxylic acids, which has a hydrocarbon radical having 4 to 10 carbon atoms.

9. A process as claimed in claim 1, wherein said lead compound is selected from the group consisting of lead monoxide, lead acetate, lead propionate, lead isobutyrate and lead lactate.

10. A process as claimed in claim 1, wherein the content of lead in the resultant plastic material is in a range of from 5 to 54% by weight.

11. A process as claimed in claim 1, wherein said polymerization is carried out in a mold.

12. A process as claimed in claim 11, wherein said mold is composed of a tempered glass.

13. A process as claimed in claim 11, wherein said mold is composed of a stainless steel.

14. A process as claimed in claim 11, wherein said mold is composed of an acrylic resin sheet superimposed on a glass plate.

* * * * *

UNITED STATES PATENT AND TRADEMARK OFFICE
CERTIFICATE OF CORRECTION

PATENT NO. : 4,292,419
DATED : Sep. 29, 1981
INVENTOR(S) : KAZUMASA KAMADA ET AL

It is certified that error appears in the above-identified patent and that said Letters Patent are hereby corrected as shown below:

On the title page, correct the priority Data to read as follows:

[30]---Foreign Application Priority Data

May 15, 1979 [JP]   Japan......54/59357

May 16, 1979 [JP]   Japan......54/59957

May 15, 1979 [JP]   Japan......54/59358

Signed and Sealed this

Ninth Day of March 1982

[SEAL]

Attest:

GERALD J. MOSSINGHOFF

Attesting Officer    Commissioner of Patents and Trademarks